(12) United States Patent
Shingai

(10) Patent No.: US 8,102,571 B2
(45) Date of Patent: Jan. 24, 2012

(54) IMAGE PROCESSING APPARATUS, PRINTER INCLUDING THE SAME, AND IMAGE PROCESSING METHOD

(75) Inventor: Kosuke Shingai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 808 days.

(21) Appl. No.: 12/203,806

(22) Filed: Sep. 3, 2008

(65) Prior Publication Data

US 2009/0073497 A1    Mar. 19, 2009

(30) Foreign Application Priority Data

Sep. 3, 2007    (JP) ................. 2007-227385

(51) Int. Cl.
*G06K 15/02*    (2006.01)
*G06K 9/46*    (2006.01)

(52) U.S. Cl. ...................................... 358/3.27; 382/190

(58) Field of Classification Search .......... 358/3.27; 382/190

See application file for complete search history.

(56) References Cited

U.S. PATENT DOCUMENTS

| | | | |
|---|---|---|---|
| 7,570,822 B2 | 8/2009 | Matsuhira | |
| 2002/0051572 A1* | 5/2002 | Matsumoto et al. | 382/190 |
| 2005/0289111 A1* | 12/2005 | Tribble et al. | 707/1 |
| 2006/0087699 A1 | 4/2006 | Matsuhira | |

FOREIGN PATENT DOCUMENTS

| | | |
|---|---|---|
| JP | 08251393 A | 9/1996 |
| JP | 11136528 A | 5/1999 |
| JP | 11177807 A | 7/1999 |
| JP | 2000-156829 | 6/2000 |
| JP | 2000-156830 | 6/2000 |
| JP | 2004-284368 | 10/2004 |
| JP | 2006-101014 | 4/2006 |
| JP | 2006101015 A | 4/2006 |
| JP | 2006101016 A | 4/2006 |
| JP | 2007067815 A | 3/2007 |

* cited by examiner

*Primary Examiner* — Charlotte M Baker

(74) *Attorney, Agent, or Firm* — DLA Piper LLP (US)

(57) ABSTRACT

An image processing apparatus, includes: a first extractor, configured to extract compression data items of a plurality of images to extraction image data items; a corrector, configured to correct the extraction image data items, when the images are printed on a print medium; a second extractor, configured to extract one of the compression data items to a sample image data item; an acquirer, configured to acquire, from the sample image data item, a characteristic information item indicative of image characteristic to be corrected by the correction, in a case where at least parts of the images to be printed are to be overlapped when viewed from a first direction; and a calculator, configured to calculate correction amounts each of which is to be applied to an associated one of the extraction image data items based on the characteristic information item.

3 Claims, 7 Drawing Sheets

IMAGE PROCESSING APPARATUS, PRINTER INCLUDING THE SAME, AND IMAGE PROCESSING METHOD

CROSS-REFERENCE TO THE RELATED APPLICATIONS

Present application claims the benefit of priority under 35 USC 119 to Japanese Patent Application No. 2007-227358 filed Sept. 3, 2007, the entire content of which in incorporated herein by reference.

BACKGROUND

1. Field of the Invention

The present invention relates to an image processing apparatus capable of performing a correcting process when an image is printed on a print medium with respect to extraction image data extracted from compression data of the image, a printer including the same, and at image processing method.

2. Description of the Related Art

Conventionally, in an image printing process, image processing of decompressing compression data such as JPEG so as to extract original image data and converting into print data according to a specified print layout is performed. A processing time necessary for the image processing is increased by increase in number of pixels configuring an image. As a result, a standby time until the start of the printing is increased. Accordingly, there is a need for shortening the processing time by increasing the efficiency of the processing.

As an example of the increase in efficiency of the processing, a technology of shortening a processing time when a compressed image is rotated and output is disclosed in Japanese Patent Publication No. 2006-101014.

However, an image may be printed on one page in plural numbers. For example, there is allocation print in which one image is printed on one page at four places or layout print in which one image is printed on one page at a plurality of places according to a layout having a predetermined position and a predetermined size (and a predetermined shape). When one image is printed on one page at the plurality of places, the image to be printed may be individually subjected to a correcting process. For example, if the face of a person included in the image is dark, a brightness correcting process of brightening the face of each of the images to be printed is performed.

If the image correcting process is performed, a process of acquiring characteristic information (for example, skin color information, brightness information or the like) of data to be corrected from the image data of an original image and calculating a necessary correction amount is performed. The process of acquiring the characteristic information is generally performed as follows. That is, sample image data sampled from the original image data is generated, a predetermined statistical value computation is performed with respect to the generated sample image data, and the result of computing the statistically value is acquired as the characteristic information.

At this time, since the sampling process of generating the sample image data from the original image data includes an image deployment process, a processing time is increased. Accordingly, if the image requiring the correction is printed on one page in plural numbers in a state in which one image has a different correction condition, since the sampling processing tine is required by the plurality off pixels when printing is performed, a standby tire until the start of the printing is increased. Accordingly, if a plurality of images to be corrected are printed on one page, there is a need for shortening the processing time by increasing the efficiency of the processing.

SUMMARY

According to an aspect of the invention, there is provided an image processing apparatus, includes: a first extractor, configured to extract compression data items of a plurality of images to extraction image data items; a corrector, configured to correct the extraction image data items, when the images are printed on a print medium; a second extractor, configured to extract one of the compression data items to a sample image data item; an acquirer, configured to acquire, from the sample image data item, a characteristic information item indicative of image characteristic to be corrected by the correction, in a case where at least parts of the images to be printed are to be overlapped when viewed from a first direction; and a calculator, configured to calculate correction amounts each of which is to be applied to an associated one of the extraction image data items based on the characteristic information item.

When the plurality of images to be corrected overlap with each other in the direction perpendicular to the transportation direction of the print medium, that is, in the print direction, it is possible to simultaneously print the plurality of images when the images are printed on the print medium. At this time, according to the above configuration, the correction amounts of the plurality of images are calculated on the basis of the characteristic information. Accordingly, since the sampling process of acquiring the characteristic information does not need to be repeatedly performed by the number of images in the process of printing the images on the print medium, it is possible to suppress the increase in standby time until the printing is started.

In the image processing apparatus, the characteristic information item may be duplicated so that each of duplicated characteristic information items are applied to an associated one of the extraction image data items.

Accordingly, it is possible to simultaneously perform the calculating processes of the correction amounts of the plurality of images. Thus, since the correction amounts of the plurality of images can be simultaneously calculated when the printing process is performed, it is possible to further suppress the increase in standby time until the printing is started.

In the image processing apparatus, the sample image data item may have lower resolution than the extraction image data items.

Accordingly, since the number of pieces of generated sample image data is decreased, the processing load of the sampling process is reduced. In addition, the data amount of the sample image data is reduced, a process of computing the correction amounts can be reduced. As a result, it is possible to suppress the increase in standby time until the printing is started.

According to another aspect of the invention, there is provided a printer including: the image processing apparatus; and a printing unit, configured to print the images on the print medium while transporting the print medium in a second direction perpendicular to the first direction According to this printer, since the above image processing apparatuses is included and thus the correction amounts of the plurality of images can be simultaneously calculated when the printing process is performed, it is possible to suppress the increase in standby time until the printing is started.

According to still another aspect of the invention, there is provided a method for processing a plurality of images, including: extracting compression data items of a plurality of images to extraction image data items; correcting the extraction image data items, when the images are printed on a print medium; extracting one of the compression data items to a sample image data item; acquiring, from the sample image data item, a characteristic information item indicative of image characteristic to be corrected by the correction, in a case where at least parts of the images to be printed are to be overlapped when viewed from a first direction; and calculating correction amounts each of which is to be applied to an associated one of the extraction image data items based on the characteristic information item.

According to this method, the same effects as the image processing apparatus can be obtained. This method may further include the process corresponding to the configuration of the image processing apparatus of the above.

BRIEF DESCRIPTION OF THE DRAWINGS

Embodiment may be described in detail with reference to the accompanying drawings, in which.

DETAILED DESCRIPTION OF THE INVENTION

Figure 1:
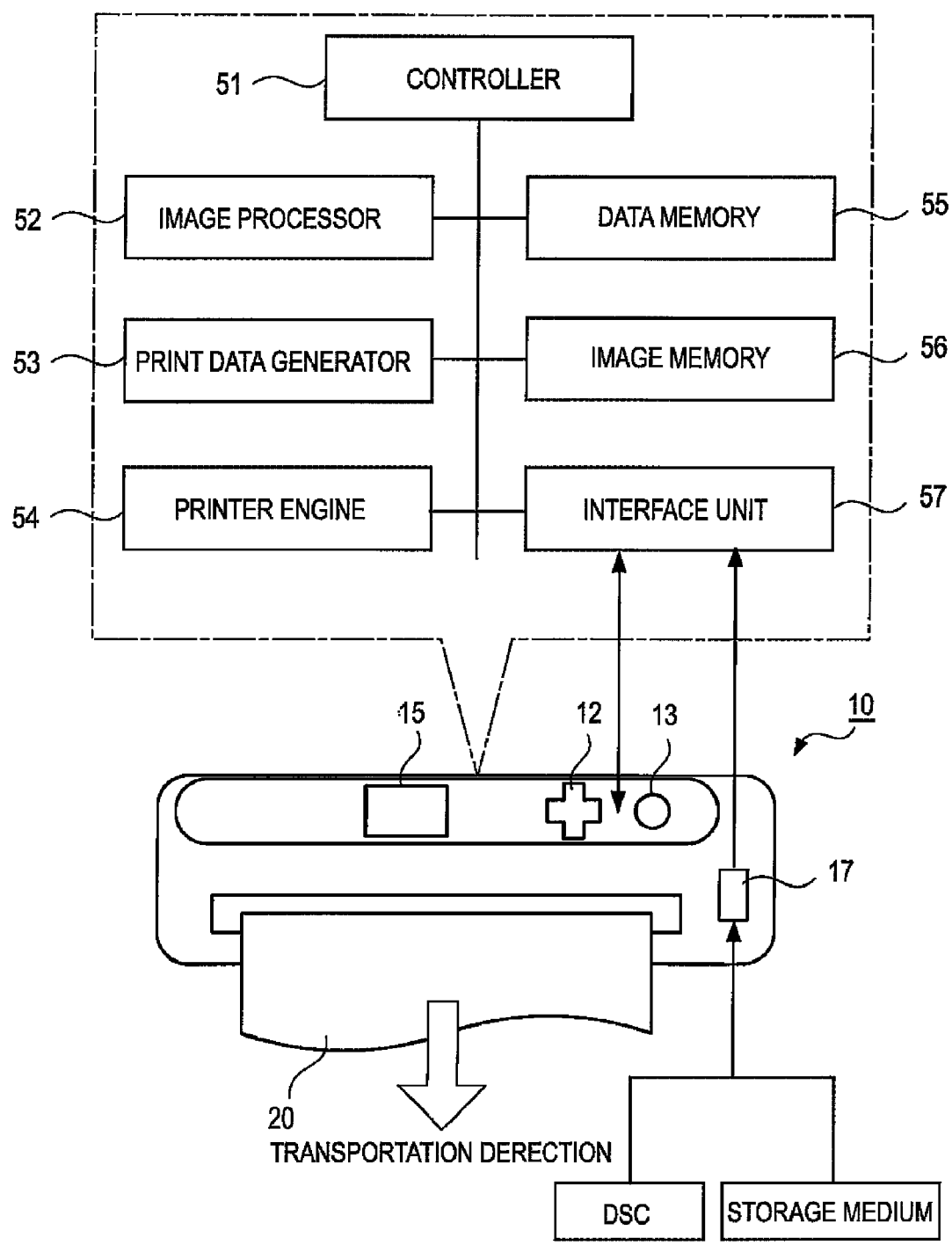
FIG. 1 is a view showing the configuration of a printer including an image processing apparatus according to an embodiment of the present invention.

Embodiments of the present invention will be described. FIG. 1 is a printer 10 including an image processing apparatus according to an embodiment of the present invention. The printer 10 receives image data output from an electronic apparatus such as a digital still camera (DSC) or a recording medium such as an IC card from an input terminal 17 included in the printer 10, generates predetermined print data, and prints an image on a print medium 20 transported in a predetermined transportation direction (a direction denoted by a white arrow of the drawing).

At this time, the printer 10 of the present embodiment is controlled by a controller 51 configured by a CPU or a memory (not shown). That is, the image data received from the input terminal 17 is received via an interface unit 57 and the received image data is subjected to necessary image processing by an image processor 52. At this time, the image data or data which is being processed is stored and read using a data memory 55. The image data which is subjected to the processing is subjected to a color converting process or a halftone process by a print data generator 53 such that predetermined print data is generated and stored in an image memory 56. Thereafter, the stored print data is output to a printer engine 54 which is a printing unit. The printer engine 54 performs the printing process of the image by setting a direction perpendicular to a transportation direction of the print medium 20 as a print direction and ejecting inks of respective colors onto the print medium 20 on the basis of the print data.

In such a printing process, if the image data received from the input terminal 17 is compression data (for example, JPEG data), the controller 51 controls the image processor 52 so as to perform a process of extracting the compression data. When the compression data is extracted, a data correcting process is also performed. In the present embodiment, the contents of the correcting process are determined by selecting correction parameters displayed on a display panel 15 provided in the printer 10 using an input unit such as a manipulation button 12 included in the printer 10 by a user of the printer 10. Accordingly, the controller 51 displays the correction parameters, which are previously stored in the controller 51, on the display panel 15 so as to be selected by the user before the correcting process. In addition, the displayed correction parameters include, for example, a filter (color/monochrome/sepia), brightness adjustment (brighter/bright/standard/dark/darker) and contrast (standard/strong/stronger).

The correction contents may be automatically determined according to types of the received image (for example, a person and a landscape). The types of the image may be acquired from metadata (for example, Exif (registered trademark) data added to the image data.

The controller 51 obtains the determined correction contents via the interface unit 57 and calculates the correction amount of the image data on the basis of the obtained correction contents. Thereafter, the controller 51 recognizes that a print start button 13 provided in the printer 10 is pressed by the user via the interface unit 57, the image processor 52 is controlled such that the image data is corrected by a correction amount. The corrected image data is converted into the print data as described above, the print data is output to the printer engine 54, and the corrected image is printed on the print medium 20.

The controller 51 also performs a process of deciding the print format such as the sizes or the number and the positions of the images printed on one page or the print direction of the image on the print medium 20. For example, an allocation printing process in which the positions and the number of the images printed on one page are allocated or a layout printing process in which the images are disposed at predetermined positions with predetermined sizes is performed. The deciding process is performed by selecting a selection item displayed on the display panel 15 provided in the printer 10 using the input unit such as the manipulation button 12 provided in the printer 10 by the user of the printer 10, Next, the process which is performed in the image processing performed by the printer 10, that is, the process of extracting the input compression data to original image data and correcting the extracted image, will be described with reference to FIGS. 2 to 4. This facilitates the understanding of the effect of the process which is performed when the image printed by correcting one image by a different correction condition exists in plural numbers on one page by the image processing apparatus of the following embodiment.

Figure 2:
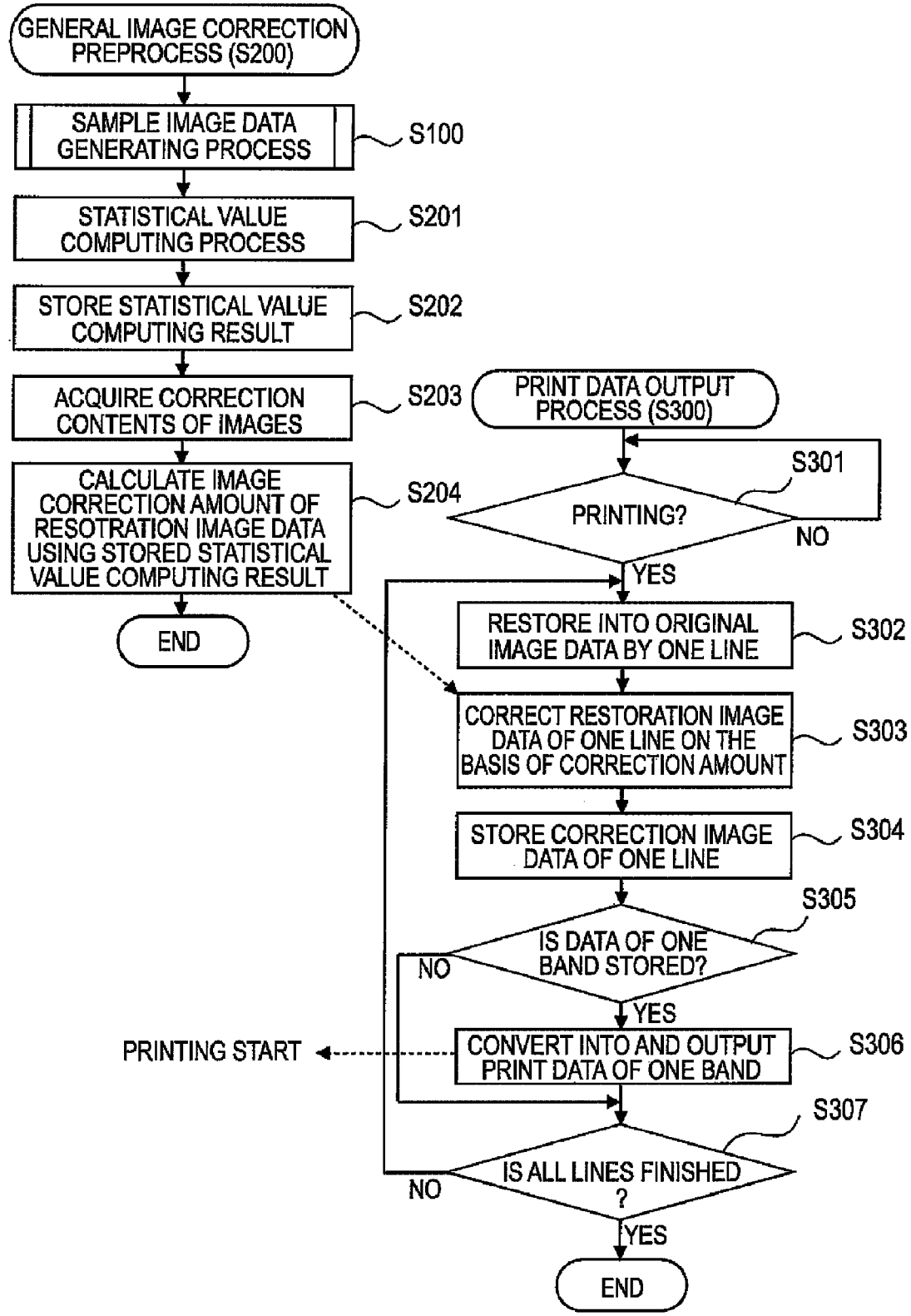
FIG. 2 is a flowchart showing a general image correction preprocess and a print data output process.

FIG. 2 is a flowchart showing a general image correction preprocessor S200 and a print data output process S300. The process of a step S100 and steps S201 to S204 is performed as the general image correction preprocess S200 with respect to the input image data and the process of steps S301 to S307 is performed as the print data output process S300. These processes are performed by executing a predetermined program stored in a memory by the controller 51 under a predetermined operating system and are basically independent of each other.

First, the general image correction preprocess S200 will be described. This process is automatically started when the image data is received from the input terminal 17. Alternatively, the general image correction preprocess may be stated at a time point when the user selects one of the image data previously stored in the data memory. In this case, the controller 51 displays the stored images on the display panel 15 and uses one image selected by the user using the manipulation button 12 as the received image data.

First, in a step S100, the received image data is subjected to a sample image data generating process. The processing step S100 is a process of generating the image data for obtaining characteristic information which becomes the reference of the calculation of the correction amount of the image performed in a step S204 and is performed by enabling the controller 51 to function as a extraction unit. The details of this process will be described with reference to FIGS. 3 and 4. In the present embodiment, the compression data is JPEG type data. The compression data is not limited to the JPEG type data and image data of other compression method such as a graphic interchange format (GIF) may be used.

In the sample image data generating process S100, first, a process of acquiring the compression data of the image is performed (step S101). In the present embodiment, the controller 51 records and acquires JPEG type compression data in the data memory 55 via the interface unit 57. Next, the sample image data of one line is extracted (step S102) and the sample image data of one line is stored (step S103). Next, it is determined whether the process of storing the sample image data of all lines is finished (step S105) and, if so not (step S105: NO), the process returns to the step S102 and the same process is repeated with respect to a next line, If all lines are finished (step S105; YES), the process progresses to the step S201 of FIG. 2.

Figure 4:
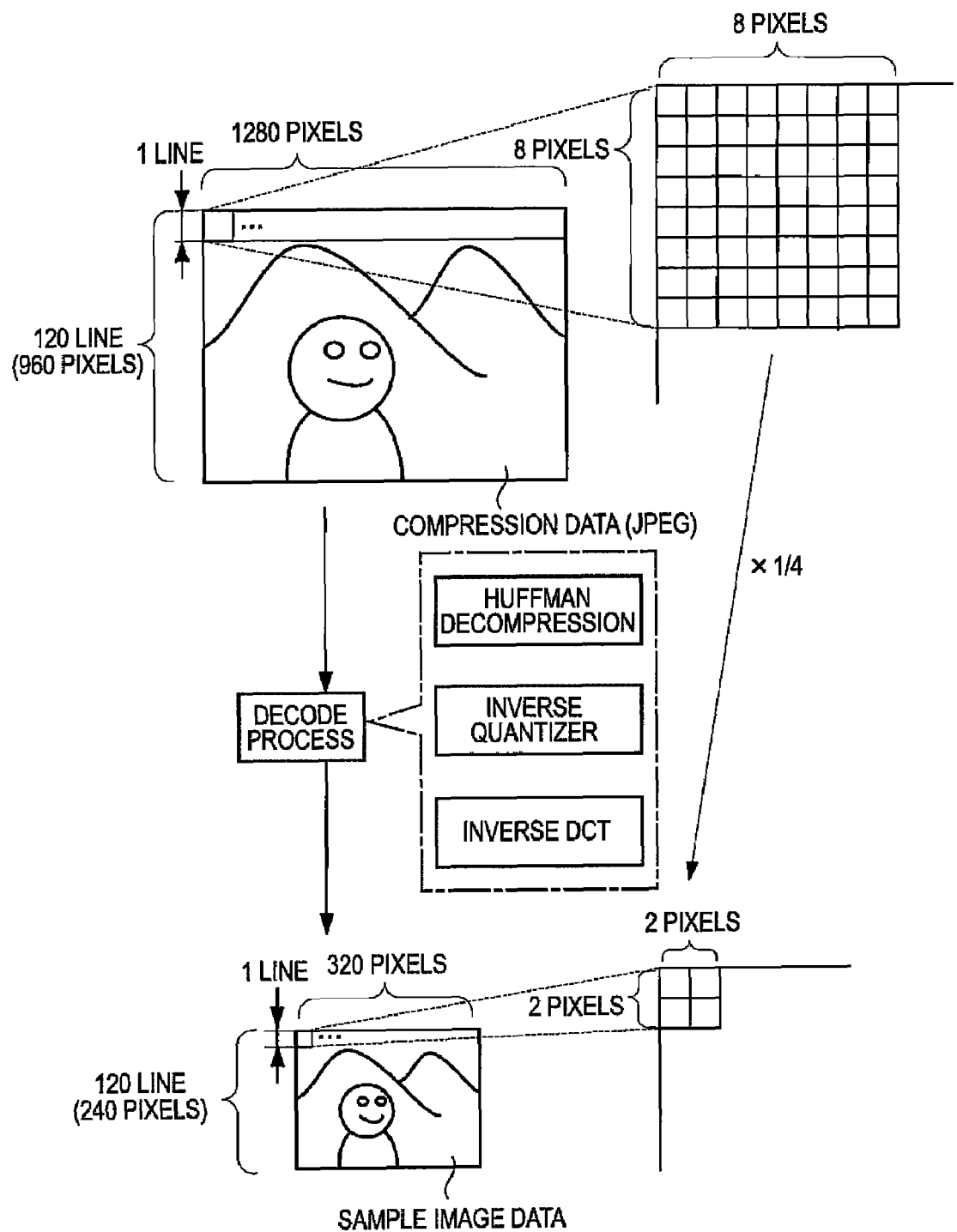
FIG. 4 is a view showing a process of converting input original image data into sample image data.

The process of the step S102, the step S103 and the step S105 will be described in detail with reference to FIG. 4. FIG. 4 shows a process of converting JPEG data of Quad-VGA in which the received original image data has 960×1280 pixels into sample image data of QVGA (Quarter-VGA) having 240×320 pixels.

First, one line of the JPEG data, that is, a block line of one column in which 8×8 pixels forms one block, is decoded. In more detail, Huffman decompression, inverse quantization and inverse DCT processes are sequentially performed. At this time, the decode process, for example, a predetermined thinning process such as the drop of the coefficient of a predetermined frequency component at the inverse DCT process is performed. In the present embodiment, the vertical and horizontal thinning rates of the extracted image are set to 1/4. Accordingly, by repeating the process of a total of 120 lines in which one line includes eight pixels, the image is converted into the image of 240×320 pixels which is 1/4 of the pixel number of the original image data.

Originally, as described above, since the sample image data becomes the reference image for obtaining the characteristic information for calculating the correction amount, it is preferable that the thinning rate is set to a value which can accurately obtaining the characteristic information. For example, a plurality of thinning rates (for example, 1/2, 1/4, and 1/8) may be previously set and a proper thinning rate may be selected according to the pixel number of the original image. If the proper thinning rate cannot be set by the pixel number ratio of the original image to the sample image, the pixel number may be corrected by a pixel interpolation process.

By thinning the original image data so as to generate the low-resolution sample image data with a small pixel number, it is possible to reduce the load of the statistical value computing process. In addition, if the pixel number of the original image is small, the thinning rate may be set to 1/1 (that is, the thinning process is not performed) such that the sample image data having the same pixel number as the original image is generated.

Returning to FIG. 2, the statistical value computing process is performed in a step S201. The controller 51 performs this process by functioning as an acquiring unit. By this process, data necessary for calculating the correction amount is computed from the sample image data. In more detail, for example, a color or brightness histogram is computed, a pixel region having a skin color is computed, or an edge position is calculated. The total result is the characteristic information representing the characteristics of the image.

Next, in a step S202, a process of storing the statistical value computing result is performed. The controller 51 performs this process by storing the statistical value computing result, that is, the characteristic information, in a predetermined region of the data memory 55. Here, the controller 51 and the data memory 55 function as a storage unit and perform the process of the step S202.

Next, in a step S203, the correction contents of the image are acquired. As described above, the correction contents of the image selected and input by the user of the printer 10 are acquired. In a step S204, a process of calculating the correction amount of the extraction image data using the store statistical value computing result is performed. For example, if, in the correction contents selected by the user, the brightness level is "bright" and the extraction image data is the data format represented by YCbCr, the correction amount of the brightness data Y corresponding to "bright" is calculated as the correction amount of the extraction image data. The controller 51 performs the process of the step S203 and the sap S204 by functioning as a calculating unit.

The above-described processes, that is, the processes from the step S100 to the step S204, are performed as the general image correction preprocess S200 with respect to the received image data.

Next, the print data output process S300 will be described. This process is simultaneously started with the general image correction preprocess S200. First, in a step S301, it is determined whether or not printing is performed. The controller 51 repeats the determination until the print start button 13 (FIG. 1) is pressed (step S301: NO). If it is determined that the print start button 13 is pressed (step S301: YES), the process progresses to a next step S302, which extracts the compression data of the image to be printed to the original image data by one line. In addition, the extraction image data is extracted to the pixel data having 960×1280 pixels as described in FIG. 4.

Subsequently, in a step S303, the extraction image data of one line is corrected on the basis of the correction amount. The controller 51 controls the image processor 52 on the basis of the correction amount calculated in the step S204 so as to correct the extraction image data. For example, as described above, if, in the correction contents selected by the user, the brightness level is "bright" and the extraction image data is the data format represented by YCbCr, the data is corrected by the correction amount of the brightness data Y calculated in the step S204. Accordingly, the controller 51 controls the step S303 to be started after the process of the step S204 of the general image correction preprocess S200 is performed. Thus, if the process of the step S204 is delayed, the process of the step S303 is delayed.

Next, correction image data of one line is stored in a step S304 and it is determined whether or not the data of one band is stored in a step S305. If the corrected extraction image data of one band is not stored (NO), the process progresses to a step S307. In contrast, if the corrected extraction image data of one band is stored (YES), a process of converting into print data of one band is performed in a step S306.

As described with reference to FIG. 1, the print data generator 53 performs the converting process such as the color converting process or the halftone process with respect to the corrected extraction image data, converts the extraction image data into predetermined print data, and stores the print data in the image memory 56. In the present embodiment, the print data is output to the printer engine 54 in the band units having a predetermined data width in the transportation direction of the print medium and a printing process is performed. Accordingly, the stored print data of one band is output to the printer engine 54 by the process of the step S306. At this time point, the printing is actually started. Since the method of outputting the print data of the band units to the printer engine 54 is known and is not important in the present embodiment, the description thereof will be omitted.

Subsequently, in a step S307, it is determined whether or not all lines are finished. If there is an unprocessed line (step S307: NO), the process returns to the step S302 and the process is repeated and, if the extracting and correcting processes of the compression data of all lines are finished (step S307: YES), the process of the print data output process S300 is finished.

As described above, the general image correction preprocess S200 and the print data output process S300 are performed with respect to the received image data. Then, if the image printed by correcting one image by a different correction condition exists in plural numbers on one page, the process performed by the image processing apparatus of the present embodiment will be described using the flowchart of FIG. 5.

Figure 5:
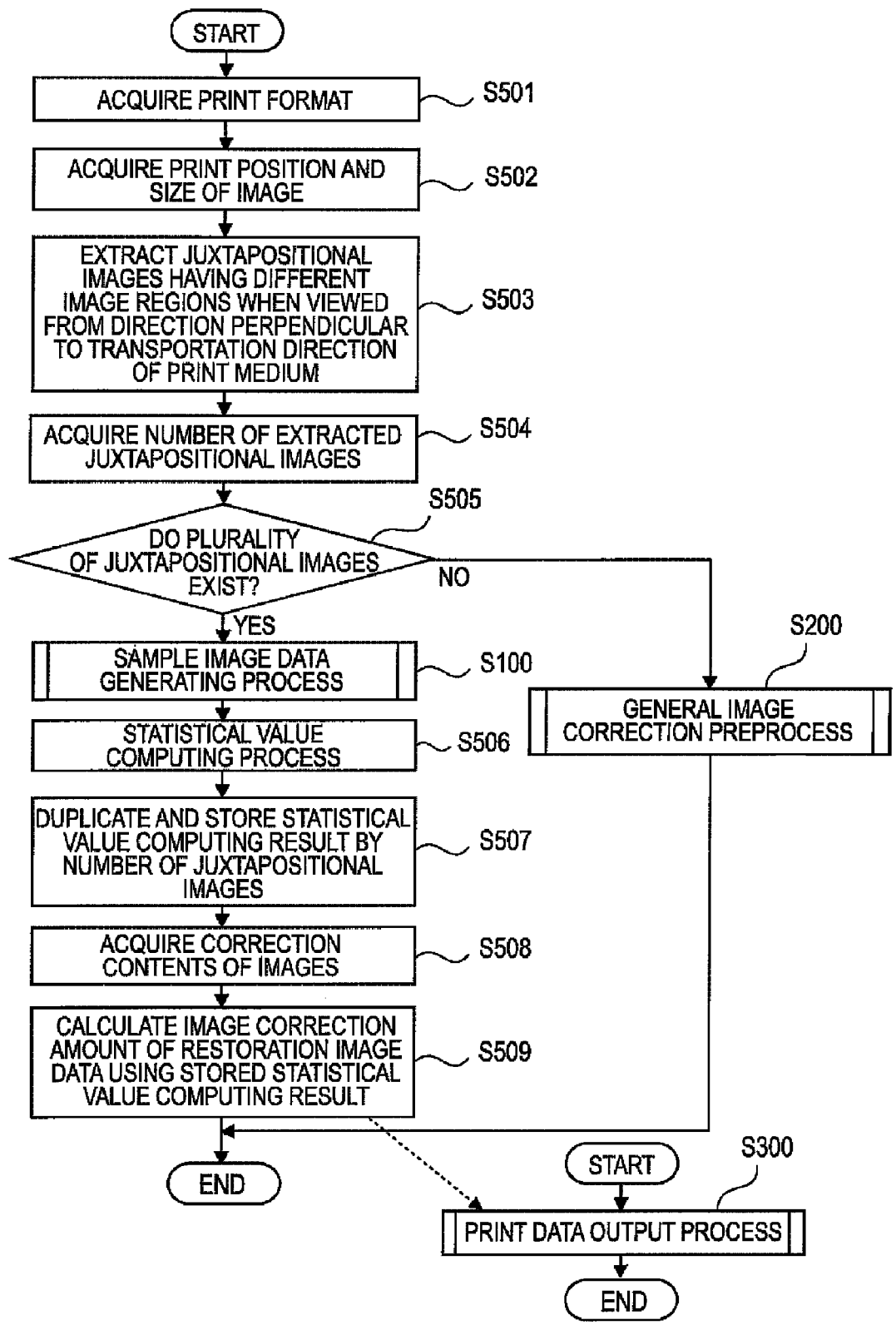
FIG. 5 is a flowchart showing a process of correcting an image printed on one page.

If the process of FIG. 5 is started, first, in a step S501, a process of acquiring the print format is performed. Subsequently, in a step S502, the print position and the size of the image are acquired. In the present embodiment, the print format selected by the user of the printer 10 is described by a page description language (PDL). Accordingly, the controller 51 acquires the position and the size of the image data from the PDL data. Subsequently, in a step S503, a process of extracting juxtapositional images having an image region overlapping when viewed from a direction perpendicular to the transportation direction of the print medium is performed. Then, in a step S504, a process of acquiring the number of extracted juxtapositional images is performed. Here, the processes from the step S501 to the step S504 will be described in detail with reference to FIG. 6.

Figure 6:
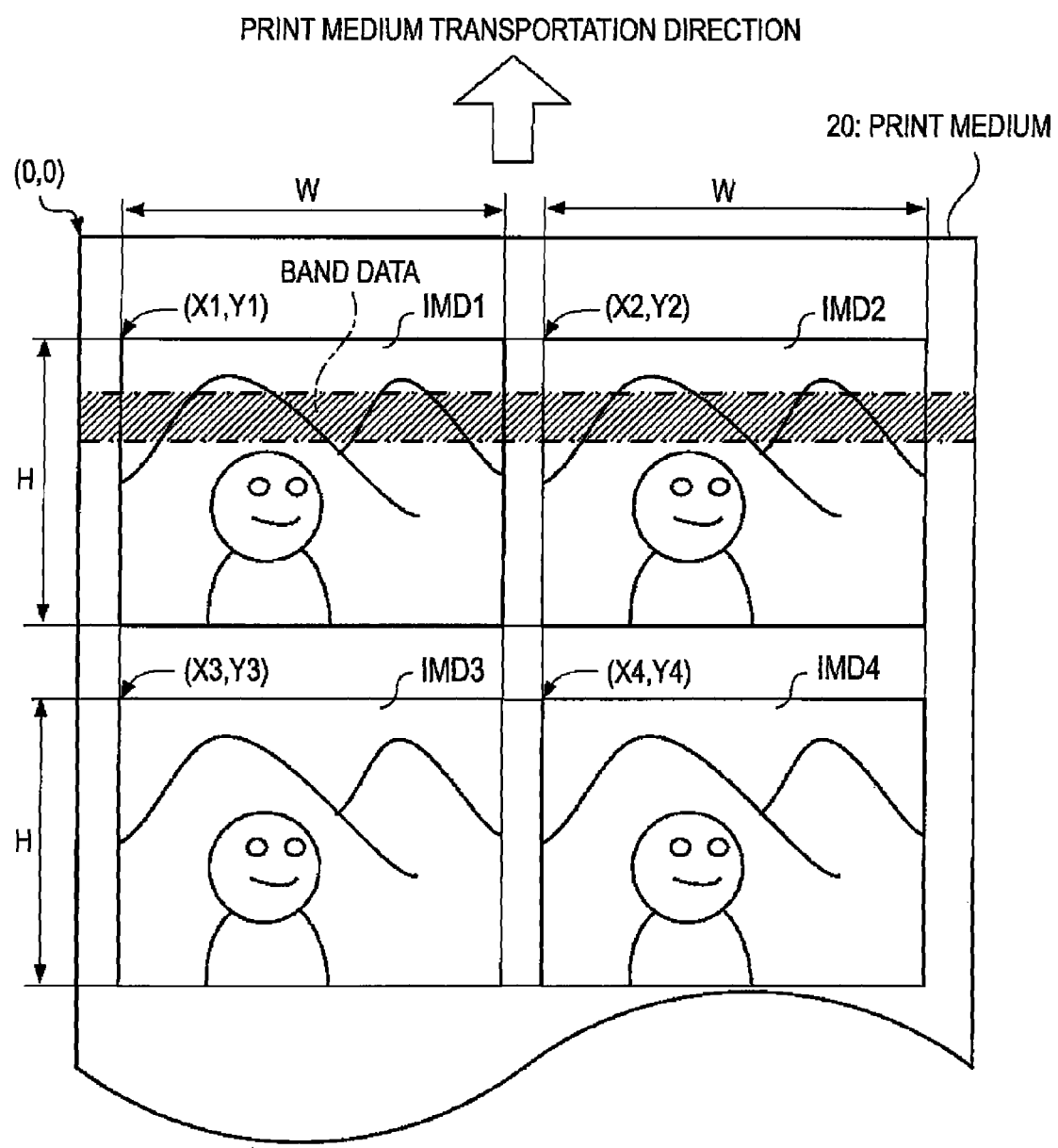
FIG. 6 is a view showing an image printed on one page by a selected print format.

FIG. 6 is a view showing the shape of the image printed on one page by correcting one image by the different correction condition. As shown, the allocation printing, in which a total of four images IMD1 to IMD4 including two same images juxtaposed in the transportation direction (the vertical direction of the drawing) of the print medium and two same images juxtaposed in the direction (the horizontal direction of the drawing) perpendicular to the transportation direction of the print medium are printed, is performed.

At this time, as shown in FIG. 6, the PDL data includes data representing the position represented by a coordinate (Xn, Yn) (n=1 to 4) in which one corner of the print medium 20 is an original point (0, 0) and a range W of the print direction and a range H of the transportation direction of the print medium 20. The controller 51 acquires the coordinates (X1, Y1), (X2, Y2), (X3, Y3) and (X4, Y4) and the values of the range W and the range H from the PDL data as the data representing the positions and the sizes of the four pieces of image data (step S502).

Next, the controller 51 extracts the juxtapositional images of which at least portions of the image regions overlap with each other in the print direction among the four images IMD1 to ID4 from the four acquired coordinates and the value of the range H. In the present embodiment, the images IMD1 and IMD2 or the images IMD3 and IMD4 are extracted as the juxtapositional images (step S503). A maximum number of extracted juxtapositional images is acquired as the number of juxtapositional images. Accordingly, in the present embodiment, "2" is acquired (step S504).

Returning to FIG. 5, in a next step S505, it is determined whether or not a plurality of juxtapositional images exist. If the plurality of juxtapositional images do not exist (NO), the general image correction preprocess (step S200) of the flowchart of FIG. 2 is performed.

Figure 3:
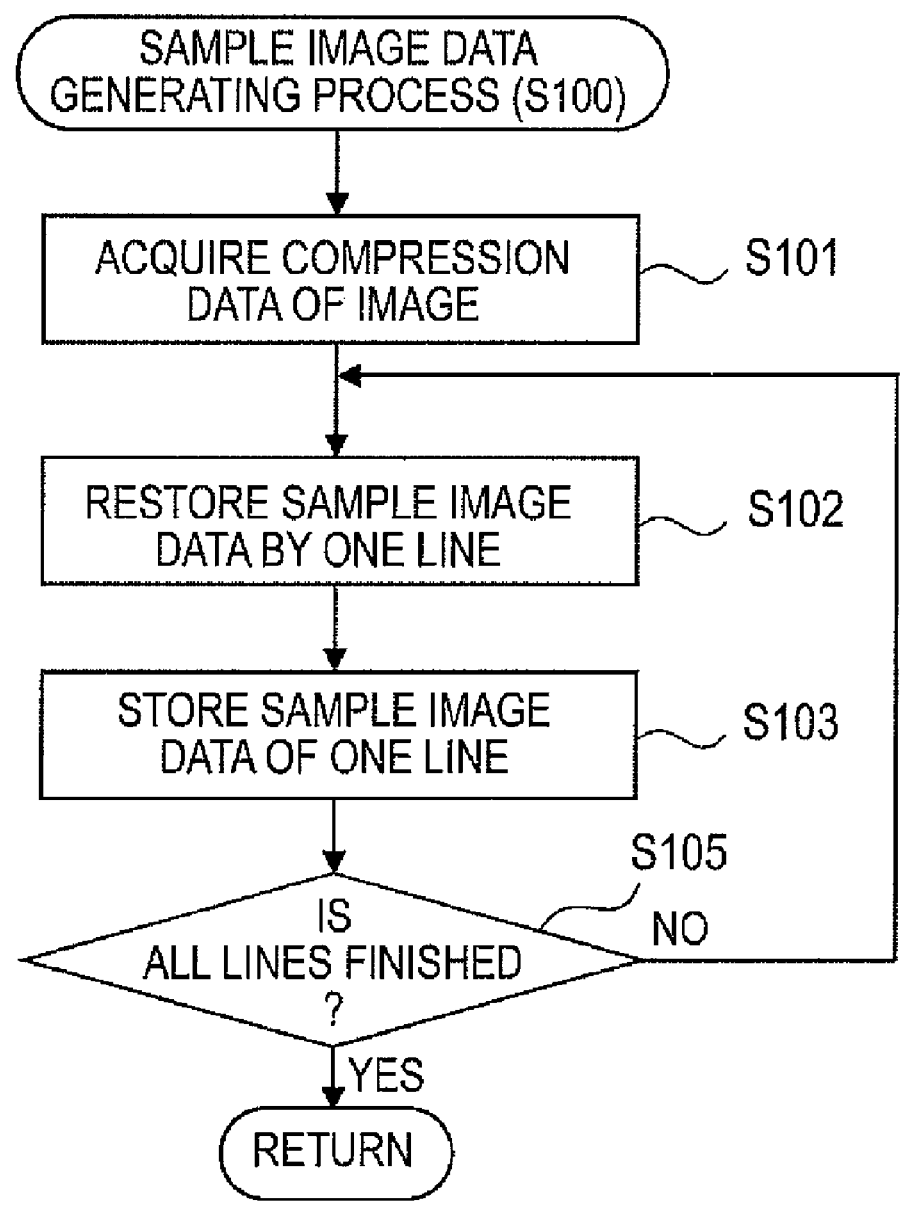
FIG. 3 is a flowchart showing a sample image data generating process of obtaining characteristic information.

In contrast, if the plurality of juxtapositional images exist (YES), the sample image data generating process (step S100) of the flowchart of FIG. 3 is performed so as to generate the sample image data and then the processes from the step S506 to the step S509 are performed. By the processes from the step S506 to the step S509, it is possible to suppress the increase in the image processing time even when the image corrected by the different correction condition with respect to one image is printed on one page in plural numbers.

First, the statistical value computing process is performed in the step S506. This process is equal to the step S201 (FIG. 2). Next, in a step S507, a process of duplicating and storing the statistical value computing result by the number of juxtapositional images is performed. The statistical value computing result is stored without duplication in the step S202 (FIG. 2). However, in this process, since the number of juxtapositional images is two, one juxtapositional image is duplicated and a total of two statistical value computing results is stored in a predetermined storage region of the data memory 55.

Next, in a step S508, a process of acquiring the correction contents of the images is performed. In the present embodiment, it is assumed that the user of the printer 10 inputs the brightness of the images as the correction contents using the manipulation button 12 of the printer 10. The correction contents are input such that the brightness of the image IMD1 is corrected to "brighter", the brightness of the image IMD2 is corrected to "bright", the brightness of the image IMD3 is corrected to "standard", and the brightness of the image IMD4 is corrected to "darker" and the controller 51 acquires the correction contents of the images.

Subsequently, in a step S509, the correction amounts of the images of the extraction image data are calculated using the plurality of stored statistical value computing results. At this time, since the statistical value computing results are duplicated by the number of juxtapositional images, the process of calculating the correction amounts of the juxtapositional images may be simultaneously performed. Since the sample image generating process of the step S100 shown in FIG. 3 does not need to be performed plural times (two times), it is possible to suppress the increase in the processing time and reduce the processing load.

In the present embodiment, first, the process of calculating the correction amounts of the image IMD1 and the image IMD2 which are juxtapositional images is performed. In more detail, the process of calculating the correction amount of the image IMD1 of which the brightness is corrected to "brighter" and the process of calculating the correction amount of the image IMD2 of which the brightness is corrected to "bright" are simultaneously performed. Next, the process of calculating the correction amounts of the image IMD3 and the image IMD4 is performed. At this time, since the process of calculating the correction amounts of all the lines is finished with reference to the image IMD1 and the image IMD2, two duplicated statistical value computing results can be used. That is, the process of calculating the correction amount of the image IMD3 of which the brightness is corrected to "standard" and the process of calculating the correction amount of the image IMD4 of which the brightness is corrected to "darker" are simultaneously performed.

When the correction amounts of the juxtapositional images are simultaneously calculated, the extraction image data can be simultaneously corrected with respect to the lines included in the band data of the juxtapositional images in the print data output process of the step S300. Accordingly, in the print data output process of the step S300 of FIG. 5, the image data correcting process of each line of FIG. 2 is simultaneously with respect to the juxtapositional images. Thereafter, the extraction image data of the juxtapositional images corrected based on the calculated correction amounts is converted into the print data (band data) in the band units and is printed.

As a result, as shown in FIG. 6, in the process of outputting the band data for printing the image, since the correction image data of the image IMD1 and the correction image data of the image IMD2 are substantially simultaneously prepared, the time until the band data is output is substantially equal to the time until the band data is output when the number of images is one even when the number of juxtapositional images to be corrected is increased. Accordingly, it is possible to suppress the time until the printing is started.

As described above, according to the present embodiment, when the image to be corrected exists in plural numbers in the direction perpendicular to the transportation direction of the print medium at the time of the printing process, the correction amounts of the images to be printed can be simultaneously calculated on the basis of the characteristic information duplicated and stored by the same number as the number of the existing images. Accordingly, in the process of printing the image on the print medium, the sampling process of acquiring the characteristic information does not need to be repeatedly performed and thus the standby time until the printing is started can be suppressed from being increased.

Although the embodiment of the invention is described, the present invention is not limited to the above-described embodiment and may be variously modified without departing from the scope of the present invention. Hereinafter, modified examples will be described.

MODIFIED EXAMPLE

Although the statistical value computing results are duplicated and stored by the maximum number of juxtapositional images existing on one pager the statistical value computing results may not be stored by the maximum number of juxtapositional images. The present modified example will be described with reference to FIG. 7.

Figure 7:
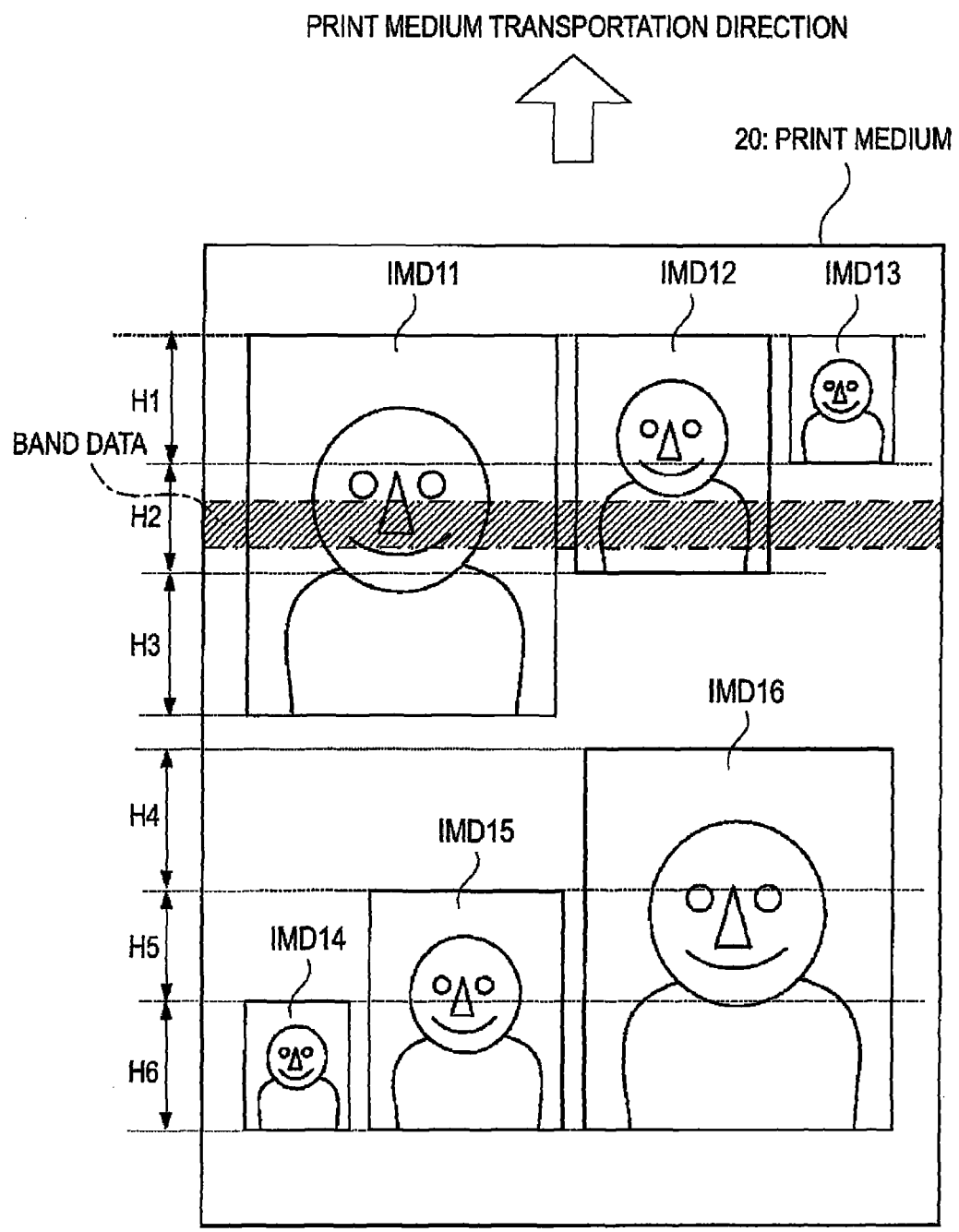
FIG. 7 is a view showing a case where images having different sizes are layout-printed.

FIG. 7 is a view showing the case where the layout print having layouts of various application photographs such as passports or driver's licenses is performed. These layouts are previously stored in the memory of the controller 51 of FIG. 1 and a layout displayed on the display panel 15 is decided by the selection of the user. The plurality of images shown in FIG. 7 are subjected to the different correcting processes with respect to the extraction image data because the sizes thereof are different. The correction contents are set as a default value according to the size of a screen.

At this time, although three juxtapositional images are extracted, two statistical value computing results are duplicated and a total of three statistical value computing result are always stored in the above-described embodiment, in the present modified example, the three statistical value computing results may not be always stored in order to reduce the stored data amounts. The process of the present modified example will be described.

As shown in FIG. 7, if the printing process is performed, an image IMD11, an image IMD12 and an image IMD13 are printed when the band data is in a range H1. Accordingly, in the process of calculating the correction amounts, since the process of correcting three pieces of extraction image data needs to be simultaneously performed, the correction amounts of the images are calculated using the three statistical value computing results together. As shown, if the band data is shifted to a range H2 in the transportation direction of the print medium, since the process of correcting the extraction image data of all the lines is finished with respect to the image IMD13, the processes of correcting the two pieces of extraction image data (image IMD11 and the image IMD12) are simultaneously performed. Accordingly, at this time, the correction amounts of the images are calculated using the two statistical value computing results together. As a result, it is possible to reduce the storage data capacity by erasing one statistical value computing result. If the band data is shifted to the range H3, since the process of correcting the extraction image data of all the lines is finished with respect to the image IMD12, the process of correcting one extraction image data (image IMD11) is performed. Accordingly, at this time, the process of correcting the image IMD11 is performed using one statistical value computing result. As a result, it is possible to reduce the storage data capacity by erasing one statistical value computing result.

In contrast, if the band data is shifted to a range H4 to a range H5, since the process of correcting two pieces of extraction image data (the image IMD16 and the image IMD15) is simultaneously performed, one statistical value computing result is duplicated and the correction amounts of two images IMD16 and IMD15 are calculated using the duplicated statistical value computing result. It the band data is shifted from the range H5 to a range H6, since the process of correcting three pieces of extraction image data (the image IMD16, the image IMD15 and the image IMD14) is simultaneously performed, one statistical value computing result is duplicated and the correction amounts of the three images IMD16, IMD15 and IMD14 are calculated using the three statistical value computing results, According to the present modified example, since the number of stored statistical value computing results is increased/decreased according to the range of the output band data, the statistical value computing result may not be always stored by the maximum number of juxtapositional images. As a result, it is possible to reduce the storage data capacity.

Although the statistical value computing result is stored by the maximum number of juxtapositional images and the correction amounts of the juxtapositional images are simultaneously calculated using the stored statistical value computing results, the present invention is not limited to this. For example, one statistical value computing result may be stored regardless of the number of juxtapositional images. In this case, since one statistical value computing result is repeatedly used by the number of juxtapositional images, for examples the method o f accessing the statistical value computing result is performed in serial and a time consumed for the process of calculating the correction amounts is required, but the sample image data generating process of the step S100 shown in FIG.

3 is performed one time. The storage capacity of the statistical value computing result may be decreased. Accordingly, although the processing time is increased in the above-described embodiment, the number of times of the sample image data process is increased. Accordingly, even when a plurality of correction images are printed, it is possible to suppress the increase in whole processing time.

Although the print data is output in the band units in the above-described embodiment, the present invention is not limited to this. For example, the print data may be output in the units of one page. In this case, since the process of calculating the correction amounts of the juxtapositional images can be simultaneously performed with respect to the images printed on one page, it is possible to suppress the increase in time until the print data of one page is output although the number of images to be printed is increased.

Although the image processing apparatus is mounted in the printer in the above-described, the image processing apparatus is not mounted in the printer and may be mounted in a separate apparatus. For example, in FIG. 1, the controller 51, the image processor 52, the data memory 55 and the interface unit 57 functioning as the image processing apparatus may be mounted in an apparatus having a computer function such as a personal computer. In this case, it is preferable that the apparatus in which the image processing apparatus is mounted includes a unit for inputting the compression data of the image.

What is claimed is:

1. An image processing apparatus comprising:
    a first extractor, configured to extract compression data items of a plurality of images to extraction image data items;
    a corrector, configured to correct the extraction image data items, when the images are printed on a print medium;
    a second extractor, configured to extract one of the compression data items to a sample image data item;
    an acquirer, configured to acquire, from the sample image data item, a characteristic information item indicative of image characteristic to be corrected by the correction, in a case where at least parts of the images to be printed are to be overlapped when viewed from a first direction; and
    a calculator, configured to calculate correction amounts each of which is to be applied to an associated one of the extraction image data items based on the characteristic information item,
    wherein the first direction is a direction perpendicular to a transporting direction of the print medium.

2. An image processing apparatus comprising:
    a first extractor, configured to extract compression data items of a plurality of images to extraction image data items;
    a corrector, configured to correct the extractor image data items, when the images are printed on a print medium;
    a second extractor, configured to extract one of the compression data items to a sample image data item;
    an acquirer, configured to acquire, from the sample image data item, a characteristic information item indicative of image characteristic to be corrected by the correction, in a case where at least parts of the images to be printed are to be overlapped when viewed from a first direction; and
    a calculator, configured to calculate correction amounts each of which is to be applied to an associated one of the extraction image data items based on the characteristic information item, wherein:
    the characteristic information item is duplicated so that each of duplicated characteristic information items are applied to an associated one of the extraction image data items.

3. An image processing apparatus comprising:
    a first extractor, configured to extract compression data items of a plurality of images to extraction image data items;
    a corrector, configured to correct the extraction image data items, when the images are printed on a print medium;
    a second extractor, configured to extract one of the compression data items to a sample image data item;
    an acquirer, configured to acquire, from the sample image data item, a characteristic information item indicative of image characteristic to be corrected by the correction, in a case where at least parts of the images to be printed are to be overlapped when viewed from a first direction; and
    a calculator, configured to calculate correction amounts each of which is to be applied to an associated one of the extraction image data items based on the characteristic information item,
    wherein the sample image data item has lower resolution than the extraction image data items.

* * * * *